(12) United States Patent
Bales et al.

(10) Patent No.: US 11,346,362 B2
(45) Date of Patent: May 31, 2022

(54) PROCESSES AND TOOLING ASSOCIATED WITH DIFFUSION BONDING

(71) Applicant: United Technologies Corporation, Farmington, CT (US)

(72) Inventors: Daniel A. Bales, Avon, CT (US); Thomas DeMichael, Stafford Springs, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 819 days.

(21) Appl. No.: 15/658,786

(22) Filed: Jul. 25, 2017

(65) Prior Publication Data

US 2019/0032674 A1 Jan. 31, 2019

(51) Int. Cl.
| | |
|---|---|
| F04D 29/38 | (2006.01) |
| F04D 29/32 | (2006.01) |
| B23P 15/04 | (2006.01) |
| F01D 5/14 | (2006.01) |
| F01D 25/28 | (2006.01) |

(52) U.S. Cl.
CPC ............ *F04D 29/388* (2013.01); *B23P 15/04* (2013.01); *F01D 5/147* (2013.01); *F01D 25/285* (2013.01); *F04D 29/322* (2013.01); *F04D 29/324* (2013.01); *F04D 29/325* (2013.01); *F05D 2220/36* (2013.01); *F05D 2230/23* (2013.01); *F05D 2230/51* (2013.01); *F05D 2230/68* (2013.01); *F05D 2300/133* (2013.01)

(58) Field of Classification Search
CPC .... F04D 29/388; F04D 25/285; F04D 29/322; F04D 29/325; B23P 15/04; F01D 5/147; F01D 25/06; B23K 20/02–04; B23K 20/001; B23K 37/04–0461; B25B 11/00; Y10T 29/49998

USPC ................ 29/281.1, 889.71, 454; 415/119; 228/193–195, 212–213, 44.3
See application file for complete search history.

(56) References Cited

U.S. PATENT DOCUMENTS

| | | | | |
|---|---|---|---|---|
| 5,384,959 | A * | 1/1995 | Velicki ................ | B21D 26/055 29/889.72 |
| 6,003,756 | A * | 12/1999 | Rhodes .................... | B22C 7/00 228/160 |
| 6,419,146 | B1 * | 7/2002 | Buldhaupt ........... | B21D 26/055 228/193 |
| 8,182,233 | B2 * | 5/2012 | Goldfinch ............. | B21D 53/78 416/229 R |
| 8,986,490 | B2 | 3/2015 | Strother | |
| 2010/0239427 | A1 | 9/2010 | Strother | |

(Continued)

FOREIGN PATENT DOCUMENTS

EP 3132918 A1 2/2017

OTHER PUBLICATIONS

European Search Report dated Dec. 6, 2018 for corresponding European Patent Application No. 18185577.6.

*Primary Examiner* — Katina N. Henson
(74) *Attorney, Agent, or Firm* — Bachman & LaPointe, P.C.

(57) ABSTRACT

A fixture assembly including a first fixture portion; a second fixture portion that interfaces with the first fixture portion; and a bladder assembly mounted to the second fixture portion to face the first fixture portion. A method of manufacturing a fan blade includes inserting a blade body and a cover into a fixture; and deploying a bladder assembly within the fixture to press the cover into the blade body.

28 Claims, 11 Drawing Sheets

(56) References Cited

U.S. PATENT DOCUMENTS

| | | |
|---|---|---|
| 2014/0241897 A1 | 8/2014 | Bales et al. |
| 2016/0076387 A1 | 3/2016 | Chauvin et al. |
| 2017/0044934 A1 | 2/2017 | Hicklin et al. |

* cited by examiner

PROCESSES AND TOOLING ASSOCIATED WITH DIFFUSION BONDING

BACKGROUND

The present disclosure relates to tooling, more particularly, to a system to assemble a fan blade.

Gas turbine engines, such as those that power modern commercial and military aircraft, generally include a fan section, a compressor section to pressurize an airflow, a combustor section to burn a hydrocarbon fuel in the presence of the pressurized air, and a turbine section to extract energy from the resultant combustion gases. The fan section drives air along a bypass flowpath while the compressor section drives air along a core flowpath for compression and communication into the combustor section.

The fan section typically includes relatively large titanium fan blades of a complicated airfoil shape. Titanium-based alloys provide exceptional fatigue properties, erosion benefits relative to aluminum alloys, and are light weight compared to steel, stainless steels, and nickel alloys. While significant weight savings can be achieved with solid titanium components, even greater weight savings can be achieved using hollow structures.

It is challenging to manufacture a complicated airfoil shape, especially a relatively large hollow fan blade (HFB) from titanium. Hollow titanium fan blades may be manufactured by diffusion bonding two machined cavity-containing plates on a neutral axis, hot forming, then pressurizing the bonded assembly to achieve its final shape within complex dies. The bonded blade subsequently must be twisted into the proper airfoil configuration, then internally pressurized to expand the relatively thin walls which have collapsed via creep during the prior diffusion bonding steps. While the process produces a structurally sound and durable product, the process is very time consuming and extremely costly.

SUMMARY

A fixture assembly according to one disclosed non-limiting embodiment of the present disclosure includes a first fixture portion; a second fixture portion that interfaces with the first fixture portion; and a bladder assembly mounted to the second fixture portion directed toward the first fixture portion.

A further aspect of the present disclosure includes that the first fixture portion interfaces with a fan blade body.

A further aspect of the present disclosure includes that the second fixture portion interfaces with the fan blade body and a cover received within the fan blade body.

A further aspect of the present disclosure includes that the bladder assembly includes a face sheet with a bellows around a periphery of the face sheet.

A further aspect of the present disclosure includes that the bellows comprises an "S" shape.

A further aspect of the present disclosure includes that the bellows is machined.

A further aspect of the present disclosure includes that the bellows is integral with the face sheet, the bellows forming a convolute.

A further aspect of the present disclosure includes a retainer to retain the bellows.

A further aspect of the present disclosure includes a seal that interfaces with an extension from the bellows.

A further aspect of the present disclosure includes a retainer to retain the bellows.

A further aspect of the present disclosure includes that the face sheet is pillowed.

A further aspect of the present disclosure includes that the face sheet includes a multiple of flats and spans therebetween, the flats correspond with a location of the ribs and the spans are of an arcuate shape.

A further aspect of the present disclosure includes that the second fixture portion includes a surface that follows a contour of the face sheet.

A method of manufacturing a fan blade according to one disclosed non-limiting embodiment of the present disclosure includes inserting a blade body and a cover into a fixture; and deploying a bladder assembly within the fixture to press the cover into the blade body.

A further aspect of the present disclosure includes pressing a face sheet into the cover.

A further aspect of the present disclosure includes pressing the cover only in areas adjacent to ribs in the blade body.

A further aspect of the present disclosure includes manufacturing the blade body and the cover from titanium.

A further aspect of the present disclosure includes pressurizing the bellows assembly.

The foregoing features and elements may be combined in various combinations without exclusivity, unless expressly indicated otherwise. These features and elements as well as the operation of the invention will become more apparent in light of the following description and the accompanying drawings. It should be appreciated, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
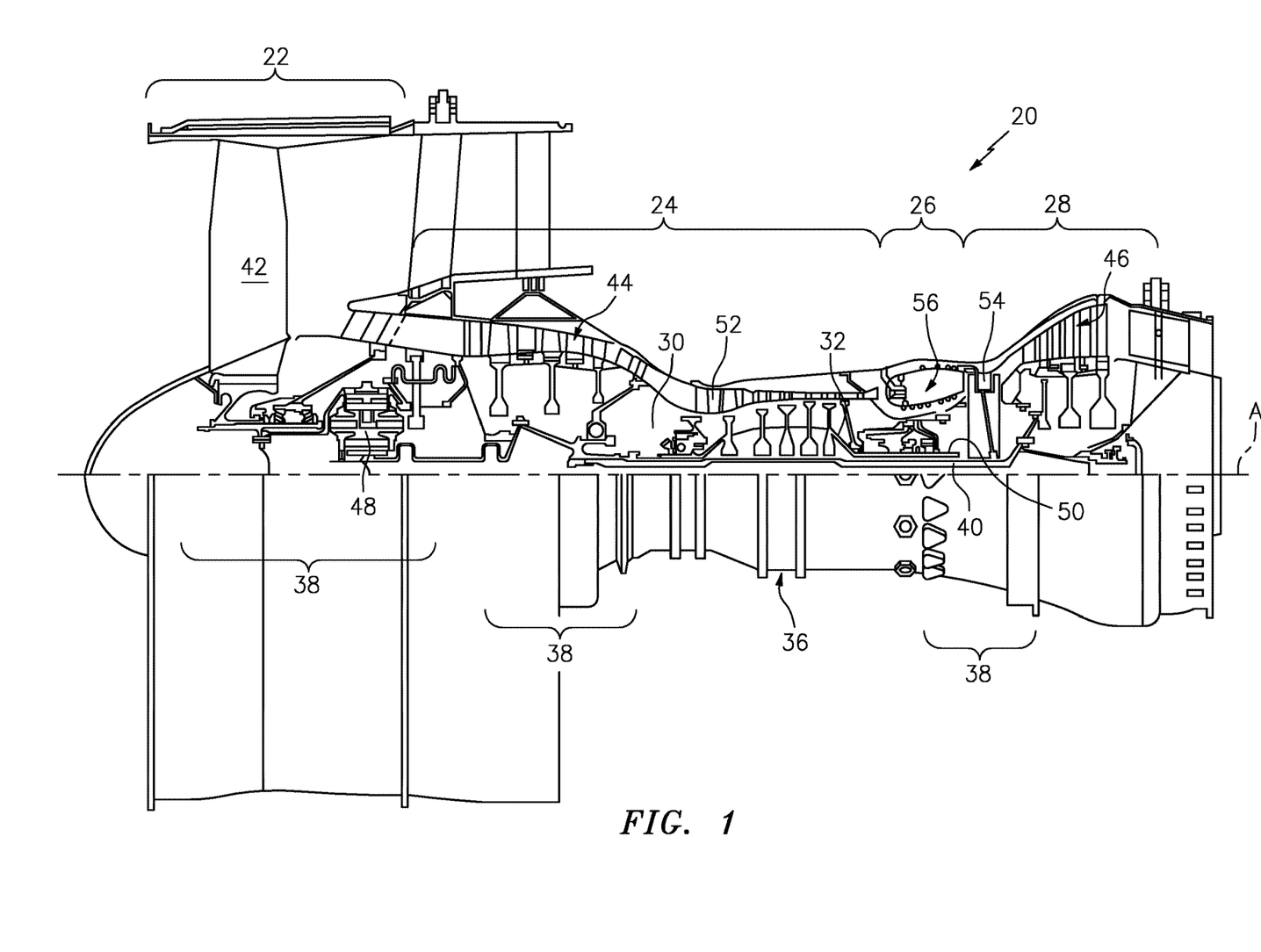
FIG. 1 is a schematic cross-section of a gas turbine engine.

FIG. 1 schematically illustrates a gas turbine engine 20. The gas turbine engine 20 as disclosed herein has a two-spool turbofan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be appreciated that the concepts described herein are not limited only thereto.

The engine 20 generally includes a low spool 30 and a high spool 32 mounted for rotation around an engine central longitudinal axis A relative to an engine static structure 36 via several bearing compartments 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary reduction transmission is an epicyclic transmission, namely a planetary or star gear system. The high spool 32 includes an outer shaft 50 that interconnects a high pressure compressor 52 ("HPC") and high pressure turbine 54 ("HPT"). A combustor 56 is arranged between the HPC 52 and the HPT 54. The inner shaft 40 and the outer shaft 50 are concentric and rotate around the engine central longitudinal axis A which is collinear with their longitudinal axes.

Core airflow is compressed by the LPC 44 then the HPC 52, mixed with fuel and burned in the combustor 56, then expanded over the HPT 54 and the LPT 46. The turbines 46, 54 rotationally drive the respective low spool 30 and high spool 32 in response to the expansion. The main engine shafts 40, 50 are supported at a plurality of points by the bearing compartments 38. It should be appreciated that various bearing compartments 38 at various locations may alternatively or additionally be provided.

The fan section 22 includes a plurality of circumferentially spaced fan blades 58 (FIG. 2) which may be made of a high-strength, low weight material such as a titanium alloy, composite material or combinations thereof. In one example, the fan blade 58 has a chord of about 12 inches (305 mm) and a span of about 30 inches (762 mm).

Figure 2:
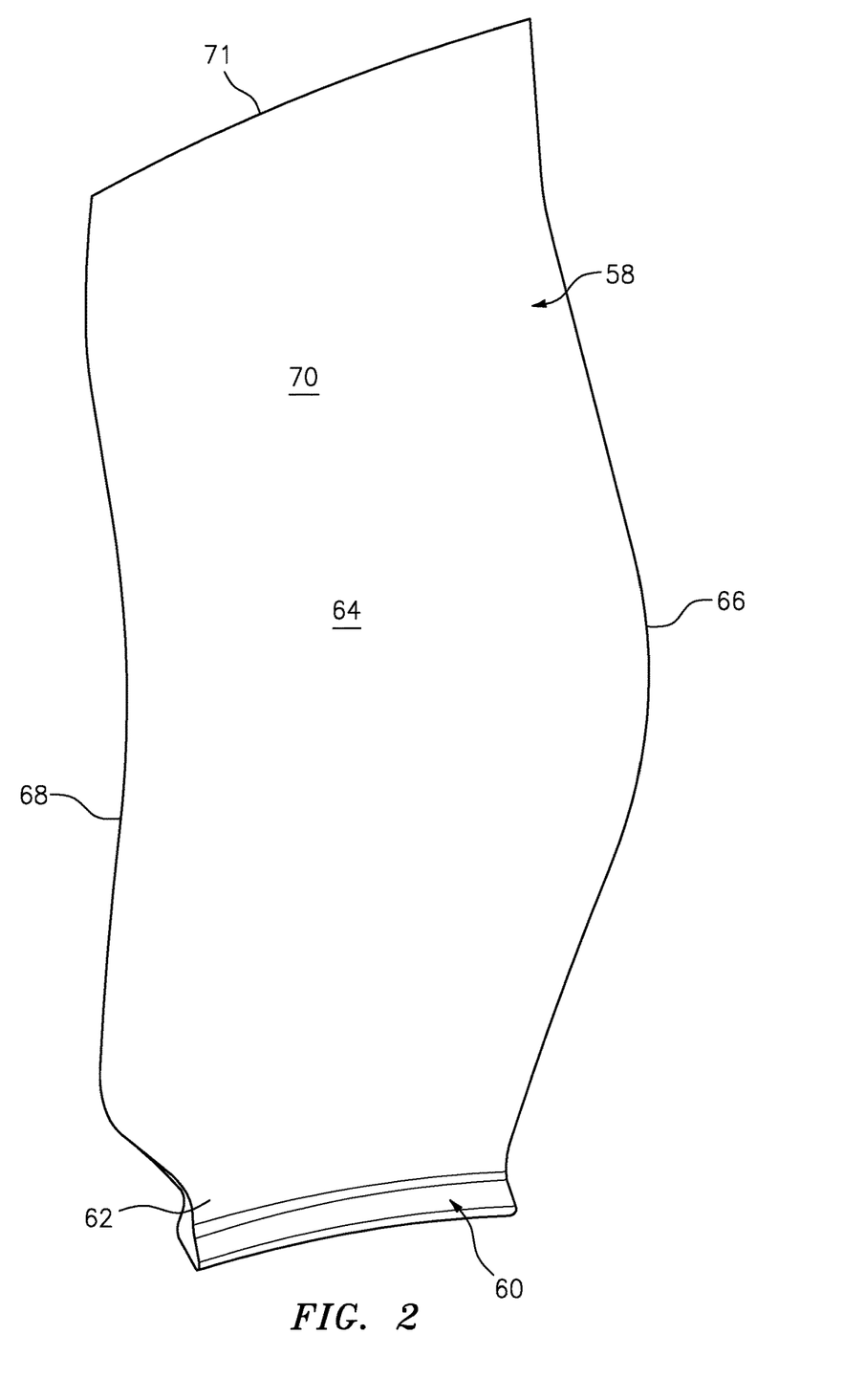
FIG. 2 is a schematic view of a fan blade for use in the gas turbine engine shown in FIG. 1.
Figure 3:
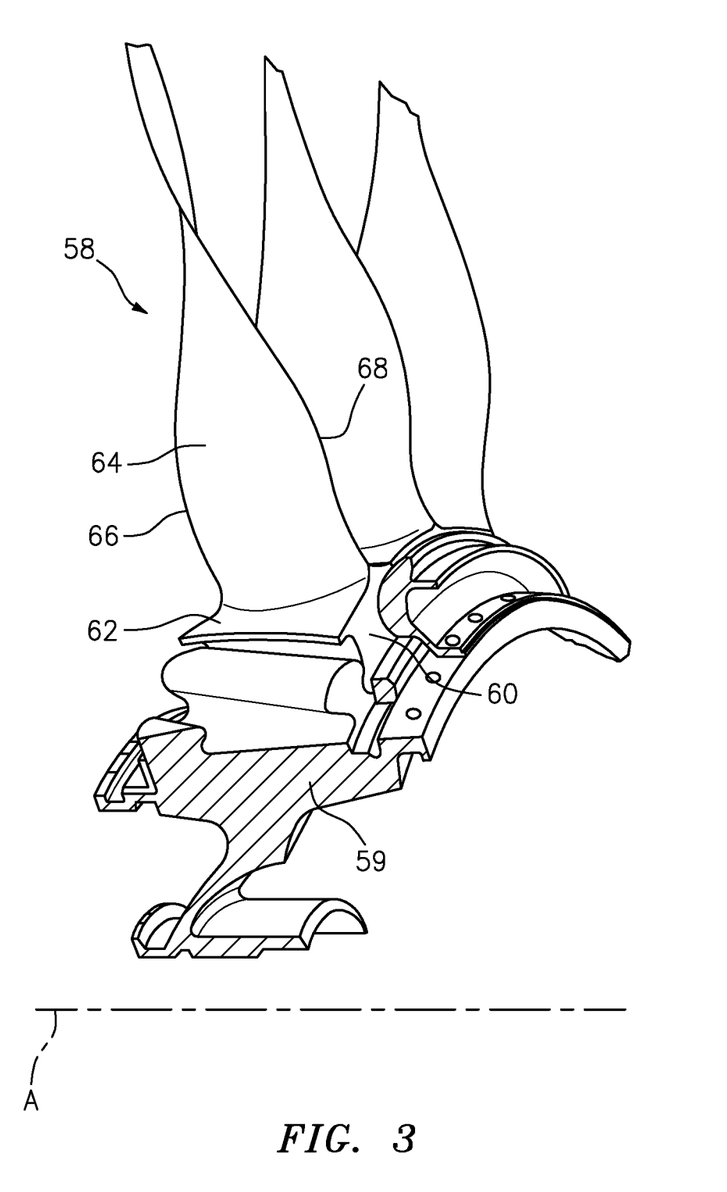
FIG. 3 is a perspective view of a rotor disk with the fan blade of FIG. 2 installed.

With reference to FIG. 2 and FIG. 3, each fan blade 58 generally includes an innermost root portion 60, an intermediate portion 62, an airfoil mid-span portion 64 and an outermost airfoil portion 71. In one form, the root portion 60 defines an attachment such as an inverted fir tree, bulb, or dovetail, so the fan blade 58 is slidably received in a complimentary configured recess provided in a fan rotor 59. The intermediate portion 62 may be a mechanically attached platform or integral that is generally between the root portion 60 and the airfoil mid-span portion 64 to define an inner boundary of the air flow path. The airfoil mid-span portion 64 defines a blade chord between a leading edge 66, which may include various forward and/or aft sweep configurations, and a trailing edge 68. A concave pressure side 70 and a convex suction side 72 are defined between the leading edge 66 and the trailing edge 68. Although a fan blade 58 is illustrated in the disclosed non-limiting embodiment, other hollow structures such as compressor blades, turbofan blades, turboprop propeller blades, tilt rotor props, vanes, struts, and other airfoils may benefit herefrom.

Figure 4:
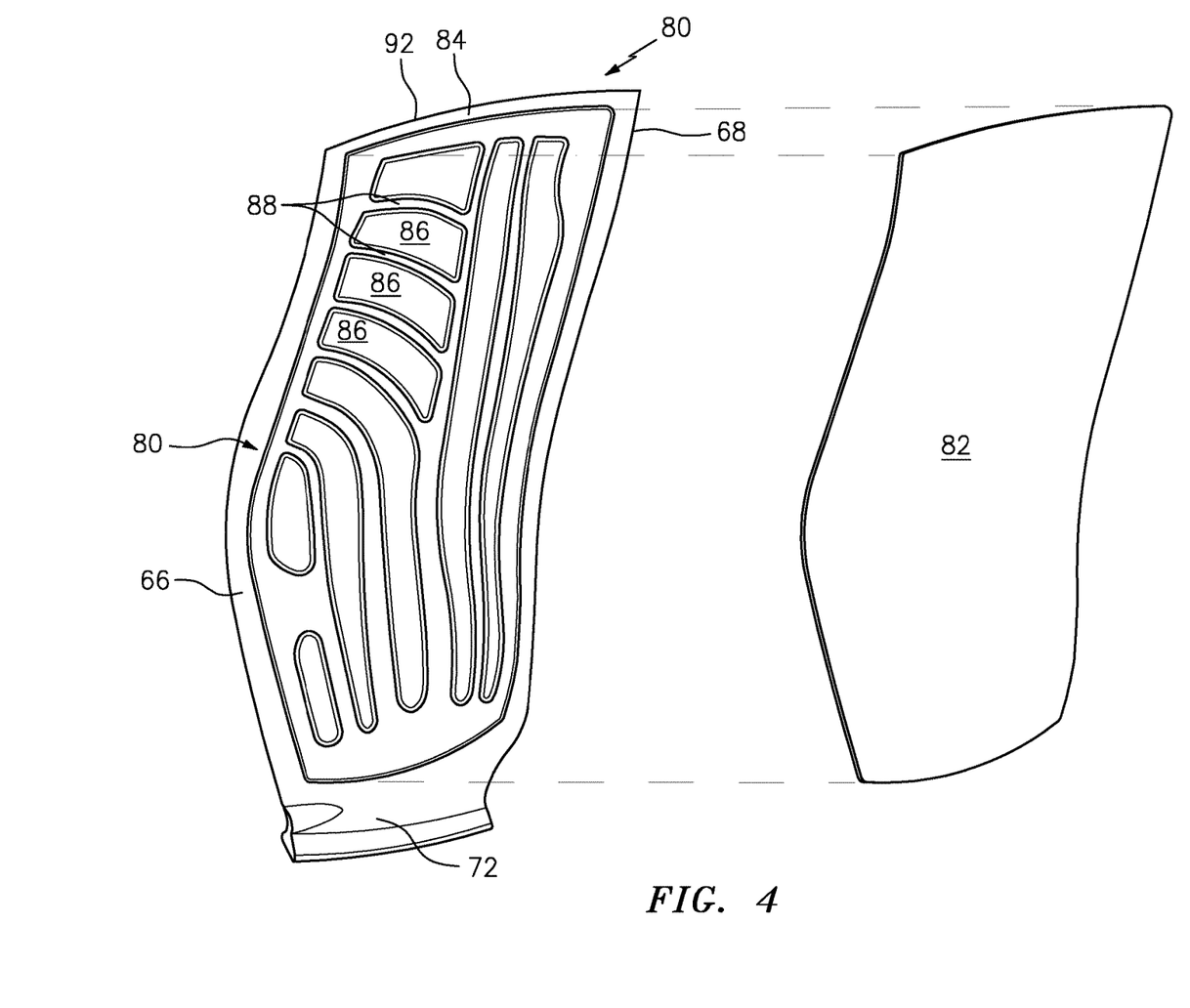
FIG. 4 is an exploded view showing internal cavities of the example fan blade of FIG. 2.
Figure 5:
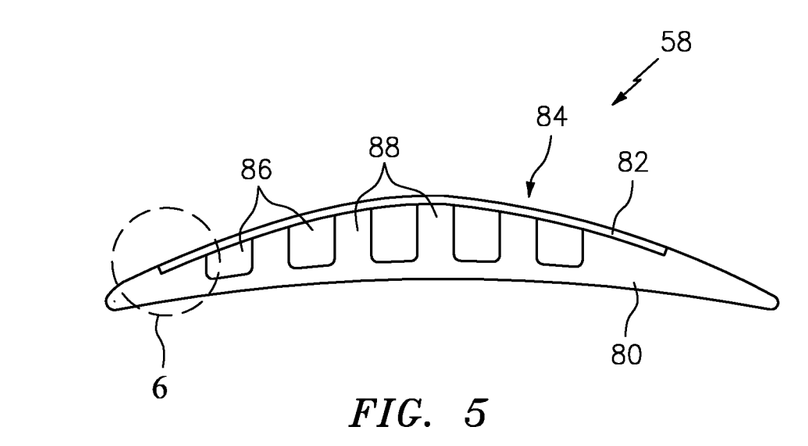
FIG. 5 is a sectional view of the example fan blade of FIG. 2.

With reference to FIG. 4, each fan blade 58 is manufactured from a blade body 80 and a cover 82 that are joined (e.g., brazed, bonded, welded, etc.) to one another to provide an exterior contour 84 of the fan blade 58 (FIG. 5). In the example, the blade body 80 is provided by a forged blank that is machined to remove material 86. The ribs 88 may be of various configurations to reduce weight while providing fan blade structural integrity, ensuring blade fatigue life to support the cover 82. The blade body 80 provides the root portion 60 and one side of the airfoil mid-span portion 64 along with the outermost airfoil portion 71. The blade body 80 also provides the fan blade leading and trailing edges 66, 68.

The cover 82 may be secured to the blade body 80 by a braze material 92 or other material or method. The cover 82 may be manufactured of titanium for its thermal expansion match with the titanium blade body 80. The cover 82 may be hot formed at processing conditions that ensure maintaining its certified mechanical properties, while achieving the desired shape for bonding. In one example, the cover 82 is about 40 to 60 thousandths of an inch (1.0-1.5 mm) in thickness and is superplastically formed to an airfoil shape.

Figure 6:
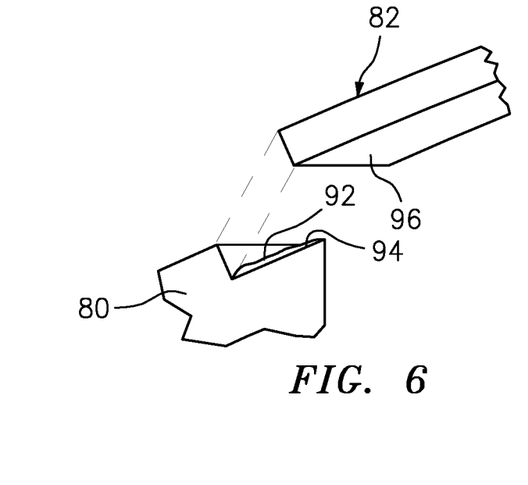
FIG. 6 is an expanded view of a portion of the example fan blade of FIG. 2 taken in the area designated in FIG. 5.
Figure 6A:
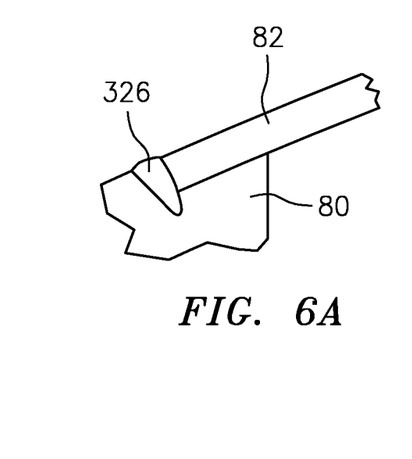
FIG. 6A is an expanded view of a portion of the example fan blade of FIG. 2 taken in the area designated in FIG. 5 in an assembled condition.

The braze material 92 in this example is provided on one or both of the first and second mating surfaces 94, 96, which are respectively provided by the blade body 80 and the cover 82 (FIG. 6). In one example, the braze material 92 is an aluminum alloy having less than 3 weight percent copper and less than 5 weight percent manganese with a solidus-liquidus range within 1175° F.-1225° F. The braze material 92 may be pre-placed onto either the titanium blade body 80 or the cover 82 as a photo etched pre-form or cathodic arc deposit. In one example, the entire surface of the side of the cover 82 being brazed or the side of the blade body 80 being brazed would be cathodic arc deposited prior to machining the blade body 80 or prior to selective etching the titanium cover 82 to only provide braze material 92 at areas being joined.

Figure 7:
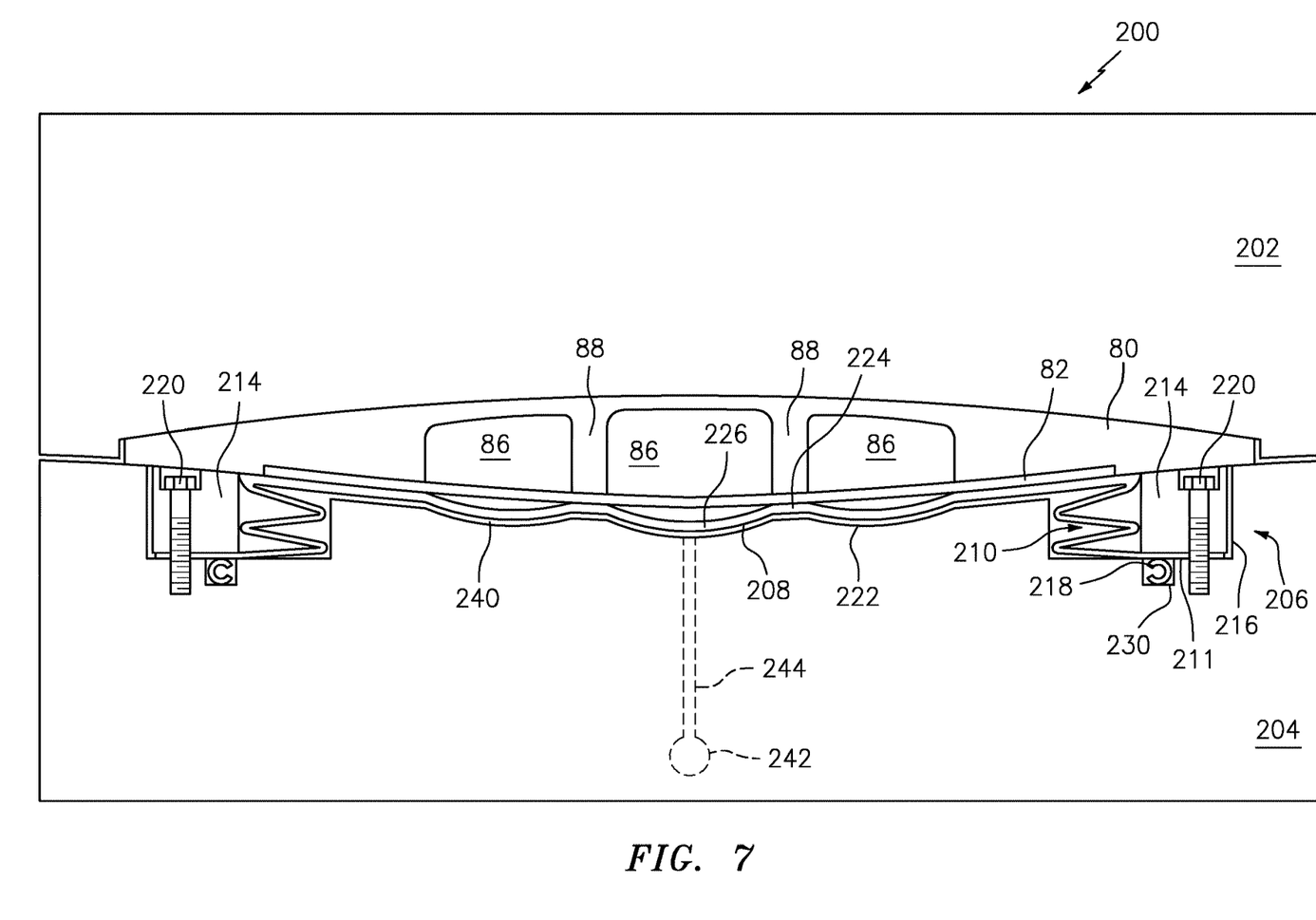
FIG. 7 is a sectional view of a fixture assembly to assembly the fan blade of FIG. 2.
Figure 8:
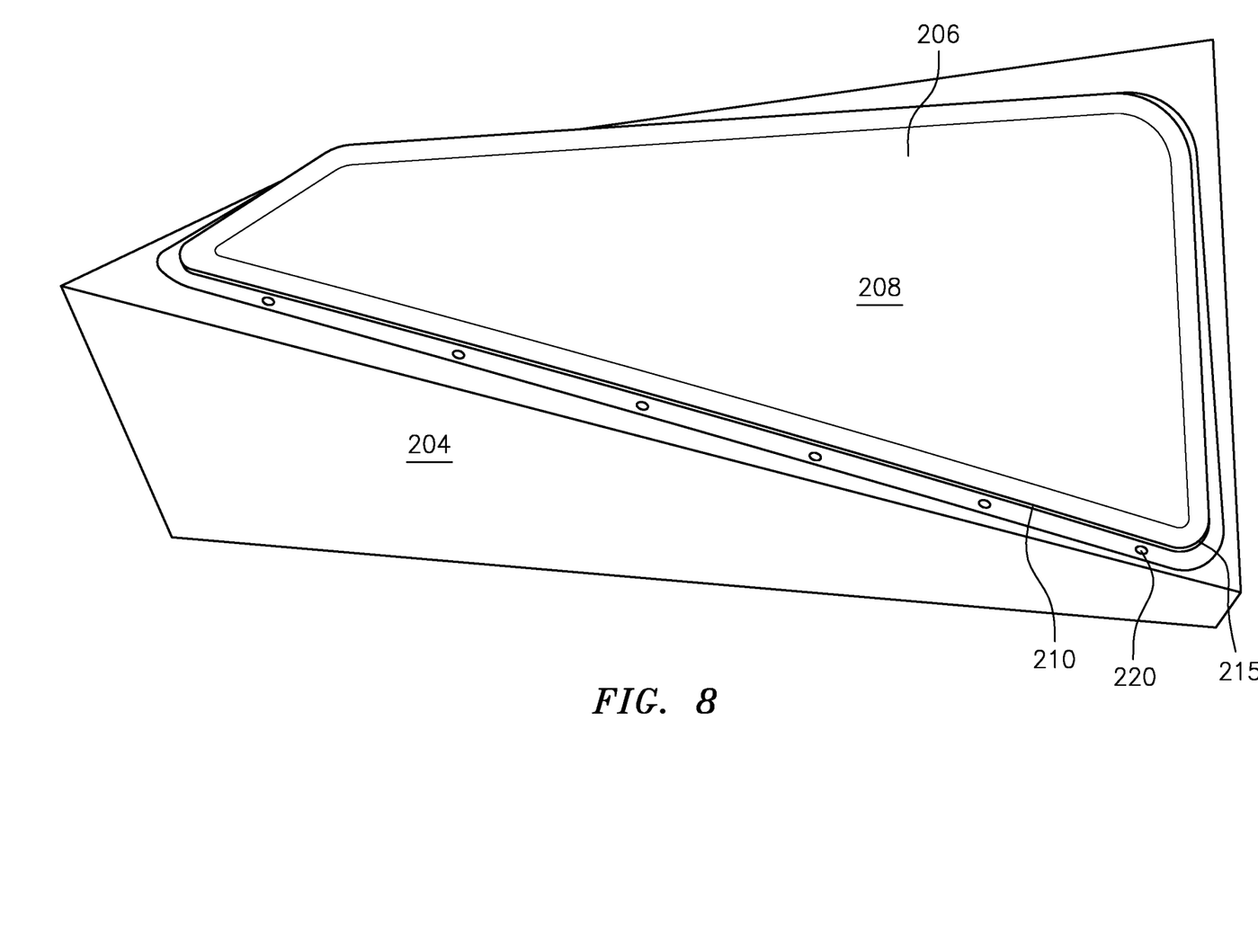
FIG. 8 is perspective view of a fixture portion of the fixture assembly illustrating the bellows assembly and face sheet thereof.

With reference to FIG. 7, a fixture 200 for manufacturing the fan blade 58 generally includes a first fixture portion 202 and a second fixture portion 204 that interfaces with the first fixture portion 202. The first fixture portion 202 may be shaped to the airfoil contour to receive the blade body 80, and the second fixture portion 204 may be shaped to the airfoil contour to press the cover 82 into the blade body 80 with a bladder assembly 206. The fixture 200 and the bladder assembly 206 may be manufactured of a high temperature capable stainless steel or nickel alloy. The airfoil contour of the first fixture portion 202 and a second fixture portion 204 are generally rectangular with an approximate twist of from about +30 degrees to about −30 degrees (FIG. 8).

The bladder assembly 206, in one embodiment, generally includes a face sheet 208 with a bellows 210 therearound. That is, the bellows 210 follow a periphery of the face sheet 208. The face sheet 208 may be machined or otherwise formed to the airfoils shape. The tolerances of the face sheet 208 may be in tens of thousandths of an inch, and more specifically, a few thousandths (e.g., 3-4 thousandths of an inch (0.08-0.1 mm) total thickness). In one example, the bellows assembly 206 provides about 100 thousandths of an inch (2.5 mm) of movement nominally to provide a uniform pressure.

The bellows 210 are retained by a respective retainer 214 that is received within a respective recess 216 in the second fixture portion 204. The retainer 214 may sandwich an extension 211 from the bellows 210. Alternatively, the retainer 214 may be integral with the bellows 210. In one example, the face sheet 208 and the bellows 210 are nominally 60 thousandths of an inch (1.5 mm) in thickness. Portions thereof may also be of various thicknesses to minimize bucking, etc.

The bellows 210 is an accordion like structure and may include radiused corners 215 (FIG. 8) to reduce point loading. The bellows 210 may be of various configurations to permit the face sheet 208 to extend and retract to thereby exert pressure on the cover 82.

A seal 218 (e.g., a C-seal) seals the bellows 210 to the second fixture portion 204 and may be compressed by a multiple of fasteners 220 (FIGS. 7 and 8) that are received through the retainer 214 about the periphery of the bellow assembly. The seal 218 may be located in a respective groove 230. The seal 218 is compressed below the extension 211 by the retainer 214 to form a pressurized space 240 to selectively deploy the face sheet 208. For example, the force in the pressurized space 240 over one atmosphere with an approximate three square foot face sheet provides about 6,400 pounds of force.

The pressurized space 240 receives an inert gas such as argon from a source 242. The inert gas is communicated to the pressurized space 240 from the source 242 through a passage network 244 (illustrated schematically) within the second fixture portion 204.

The second fixture portion 204 includes a surface 222 that generally corresponds with the shape of the face sheet 208 with the pressurized space 240 therebetween. In one embodiment, the face sheet 208 may be pillowed to include a multiple of flats 224 and spans 226 therebetween. The flats 224 correspond with the location of the ribs 88 and the spans 226 may be of an arcuate shape to be spaced away from the cover 82. The flats 224 on the face sheet 208 thereby interface with the cover 82 in the region of the ribs 88 to maximize the pressure, and thus the adherence, of the cover 82 to the ribs 88.

Figure 9:
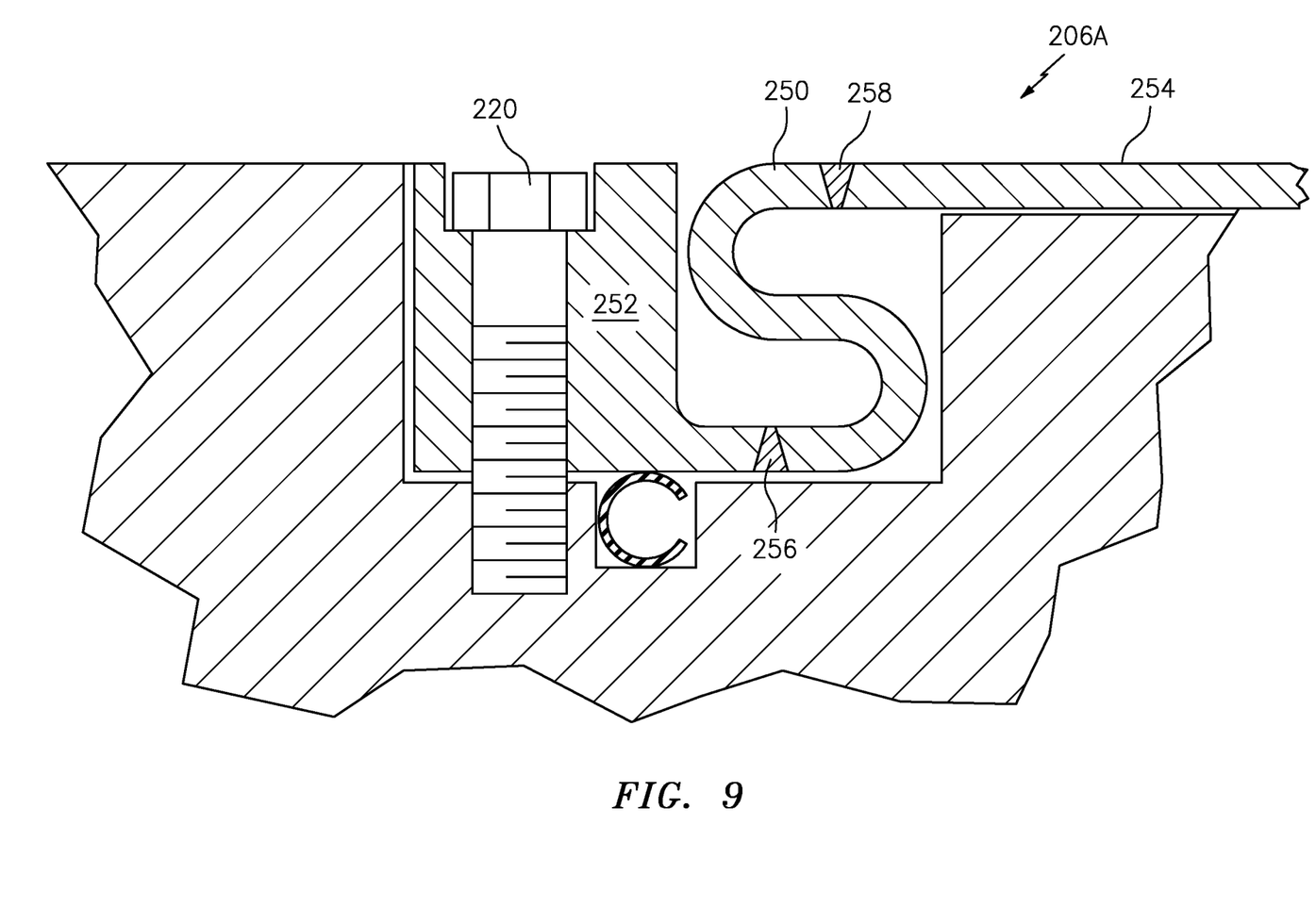
FIG. 9 is a sectional view of the bellows assembly according to one embodiment.
Figure 10:
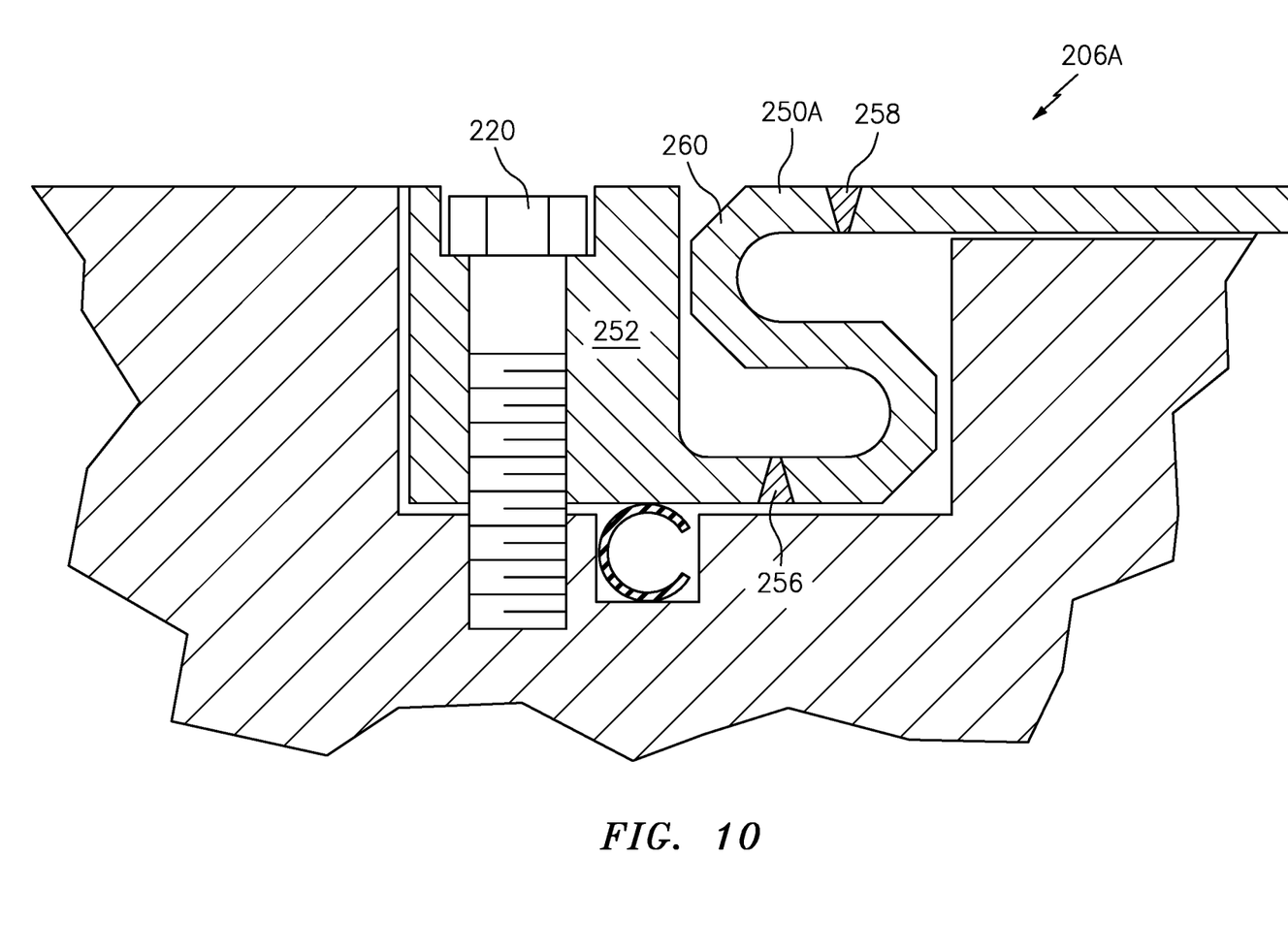
FIG. 10 is a sectional view of the bellows assembly according to another embodiment.

With reference to FIG. 9, in another embodiment, a bladder assembly 206A includes a formed "S" shaped bellows 250. The bellows 250 may be welded to a retainer 252 and a face sheet 254 at a respective first and second weld 256, 258 to form an integral structure. In another embodiment, the "S" shaped bellows 250A is machined to form angles 260 (FIG. 10).

Figure 11:
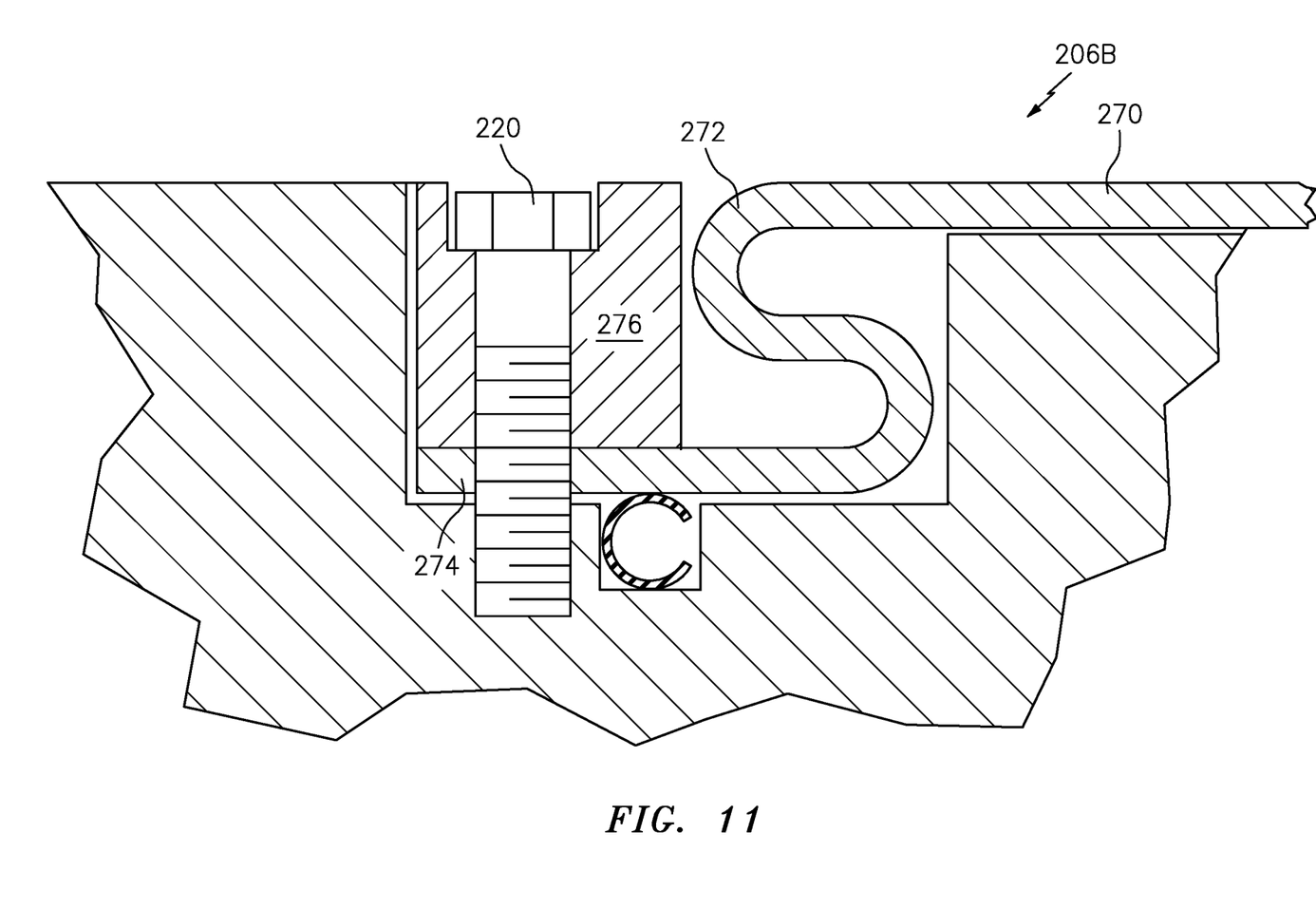
FIG. 11 is a sectional view of the bellows assembly according to another embodiment.

With reference to FIG. 11, in another embodiment, a bladder assembly 206B includes an integral face sheet 270 and convolute 272 that operates as the bellows. The convolute 272 includes an extension 274 that is sandwiched by a retainer 276.

Figure 12:
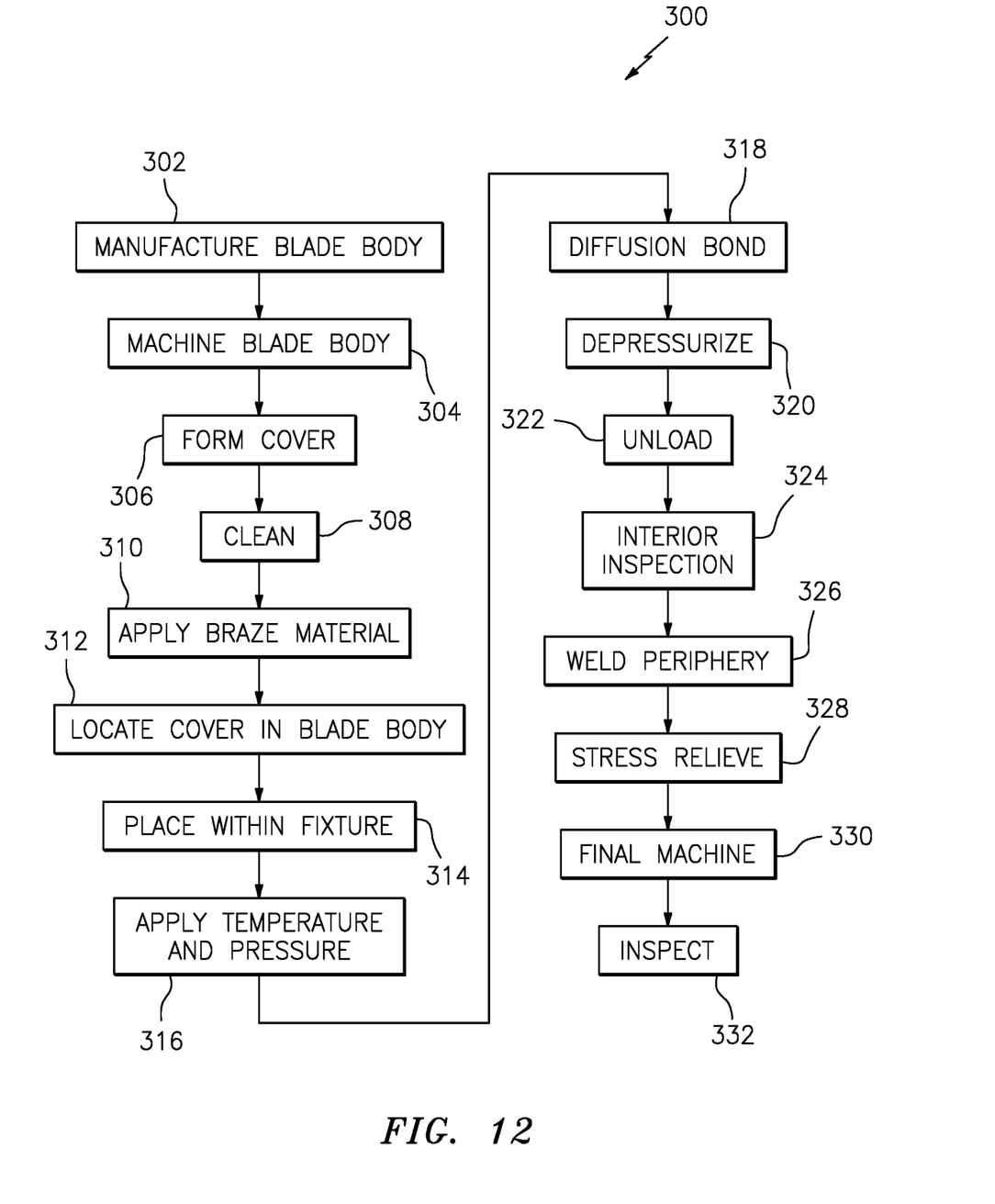
FIG. 12 is a flow diagram of a method of using the fixture assembly to assemble the fan blade.

With reference to FIG. 12, a method 300 for manufacturing the fan blade 58 is schematically disclosed in terms of a functional block diagram flowchart. It should be appreciated that alternative or additional steps may be provided without departing from the teaching herein.

Initially, the blade body 80 is manufactured (302). The blade body 80 may, for example, be produced as a near-net-shape titanium (e.g., Ti-6-4) blade forging (FIG. 4).

Next, the blade body 80 is machined (304). In one embodiment, the convex suction side 72 is machined to form a cavity-back blade blank (FIG. 4). The machining forms the ribs 88 (FIG. 4) to reduce weight while providing fan blade structural integrity, ensuring blade fatigue life to support the cover 82.

Next, the cover 82 is formed (306). The cover, in one example, may be superplastic formed and chemical milled from titanium (e.g., Ti-6-4).

Next, the blade body 80 and the cover 82 are cleaned (308). In one example, the cleaning may include laser cleaning of the bond surfaces.

The braze material 92, when utilized, is then located on one or both of the first and second mating surfaces 94, 96 (310).

The cover 82 is then located (312) into the blade body 80 and mounted (314) within the fixture 200.

Next, pressure is applied (316) via deploying the bladder assembly 206. That is, the face sheet presses the cover 82 into the blade body 80. This may be performed while temperature is increased.

The cover 82 is then diffusion bonded and/or brazed (318) into the blade body 80 for the required temperature, time, and pressure. The diffusion bond reduces the otherwise elevated temperature processing to a temperature range of 1400-1600 degrees Fahrenheit (760-871 degrees Celsius). Alternatively, an adhesive bond or a low temperature bond for composite components may also benefit herefrom to replace an autoclave and/or vacuum bagging. That is, various bonding, brazing, and/or adhesives may benefit from the pressure provided by the bladder assembly 206.

After the required bond temperature, time, and pressure have occurred, the bladder assembly 206 of the fixture 200 is de-pressurized (320) and cooled to the required temperature.

The fan blade 58 is then unloaded (322). Interim inspection (324) may then be performed.

Next, the periphery of the cover 82 is welded (e.g., laser or electron beam welded; 326) to the blade body 80. Typically, this is only required if the cover 82 is recessed. The fan blade 58 may then be stress relieved (328) from residual stresses that may have been caused by the welding process. Then, the bonded fan blade 58 is final machined (330) then inspected (332).

The fixture and method provides a weight-neutral, cost effective, hollow titanium fan blade that can replace the very complex hybrid aluminum hollow fan blade. Such can eliminate multiple time consuming, costly processes presently necessary with an aluminum hybrid hollow fan blade. The method is also significantly more environmentally friendly because the reduction in elevated temperature processing time results in less surface contamination that must be removed by acids.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that relative positional terms such as "forward," "aft," "upper," "lower," "above," "below," and the like are with reference to the normal operational attitude of the vehicle and should not be considered otherwise limiting.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A fixture assembly, comprising:
a first fixture portion shaped to an exterior airfoil contour to receive a blade body that comprises a blade leading edge and a blade trailing edge;
a second fixture portion that interfaces with the first fixture portion; and
a bladder assembly mounted to the second fixture portion and directed toward the first fixture portion, wherein the bladder assembly includes a face sheet with a bellows around a periphery of the face sheet, the face sheet shaped to the exterior airfoil contour of a cover for the blade body, deployment of the bladder assembly serves to move the face sheet toward the first fixture portion and press the cover toward the blade body.

2. The assembly as recited in claim 1, wherein the blade body is manufactured of titanium.

3. The assembly as recited in claim 1, wherein the cover is manufactured of titanium.

4. The assembly as recited in claim 1, wherein the bellows comprises an "S" shape in cross-section.

5. The assembly as recited in claim 4, wherein the bellows is machined about the periphery of the face sheet.

6. The assembly as recited in claim 1, wherein the bellows is integral with the periphery of the face sheet, the bellows forming a convolute.

7. The assembly as recited in claim 1, further comprising a retainer to retain the bellows.

8. The assembly as recited in claim 7, further comprising a seal that interfaces with an extension from the bellows.

9. The assembly as recited in claim 4, further comprising a retainer to retain the bellows.

10. The assembly as recited in claim 1, wherein the face sheet is pillowed.

11. The assembly as recited in claim 1, wherein the face sheet includes a multiple of flats and spans therebetween, each of the multiple of flats correspond with a location of a rib in the blade body to press the cover against the rib, the spans are of an arcuate shape displaced from the cover.

12. The assembly as recited in claim 1, wherein the second fixture portion includes a surface that follows a contour of the face sheet.

13. A method of manufacturing a fan blade, comprising:
inserting a blade body and a cover into a first fixture portion and a second fixture portion; and
deploying a bladder assembly within the second fixture portion directed toward the first fixture portion to press the cover into the blade body, where the bladder assembly includes a face sheet with a bellows around a periphery of the face sheet, the face sheet shaped to an exterior contour of the cover of the blade body, wherein deploying the bladder assembly includes pressing the face sheet into the cover only in areas adjacent to ribs in the blade body.

14. The method as recited in claim 13, further comprising manufacturing the blade body and the cover from titanium.

15. The method as recited in claim 13, wherein deploying the bladder assembly includes pressurizing the bellows assembly.

16. The assembly as recited in claim 1, wherein a tolerance of the face sheet is in tens of thousandths of an inch to the exterior airfoil contour of a cover for the blade body.

17. The assembly as recited in claim 1, wherein the bellows provides 100 thousandths of an inch (2.5 mm) of movement nominally to provide a uniform pressure to the cover.

18. The assembly as recited in claim 1, wherein the bellows are retained by a retainer that is received within a respective recess in the second fixture portion.

19. The assembly as recited in claim 18, wherein the retainer sandwiches an extension from the bellows.

20. The assembly as recited in claim 18, wherein the retainer is integral with the bellows.

21. The assembly as recited in claim 1, wherein the cover at least partially forms a concave pressure side of a fan blade.

22. The assembly as recited in claim 21, wherein the face sheet is shaped with an approximate twist of from about +30 degrees to about −30 degrees.

23. A fixture assembly for a fan blade of a gas turbine engine, comprising:
a first fixture portion shaped to an exterior airfoil contour of a fan blade body, the fan blade body forms a convex suction side of a fan blade and a fan blade leading edge and a fan blade trailing edge;
a second fixture portion that interfaces with the first fixture portion; and
a bladder assembly mounted to the second fixture portion and directed toward the first fixture portion, wherein the bladder assembly includes a face sheet with a bellows around a periphery of the face sheet, the face sheet shaped to an exterior airfoil contour of a cover for the fan blade body, deployment of the bladder assembly serves to move the face sheet toward the first fixture portion and press the cover at least partially into the fan blade body.

24. The assembly as recited in claim 23, wherein the cover partially forms a concave pressure side of the fan blade.

25. The assembly as recited in claim 23, wherein the bellows is integral with a periphery of the face sheet, the bellows forming a convolute, a seal seals the bellows to the second fixture portion to form a pressurized space, pressurization of the pressurized space operable to move the face sheet.

26. The assembly as recited in claim 25, further comprising a source of inert gas to selectively communicate inert gas to the pressurized space through a passage network within the second fixture portion.

27. The assembly as recited in claim 23, wherein the face sheet and the bellows are nominally 60 thousandths of an inch (1.5 mm) in thickness.

28. The assembly as recited in claim 25, wherein the face sheet is shaped with an approximate twist of from about +30 degrees to about −30 degrees.

* * * * *